(12) United States Patent
Chen et al.

(10) Patent No.: US 7,754,171 B2
(45) Date of Patent: Jul. 13, 2010

(54) MULTILAYERED CATALYST COMPOSITIONS

(75) Inventors: Shau-Lin F. Chen, Piscataway, NJ (US); Knut Wassermann, Princeton, NJ (US); Stephan Siemund, Pattensen (DE); Tian Luo, Piscataway, NJ (US); Torsten Neubauer, Langenhagen (DE); Jin Sakakibara, Edison, NJ (US); Harold Rabinowitz, Montclair, NJ (US)

(73) Assignee: BASF Corporation, Florham Park, NJ (US)

( * ) Notice: Subject to any disclaimer, the term of this patent is extended or adjusted under 35 U.S.C. 154(b) by 140 days.

(21) Appl. No.: 11/971,515

(22) Filed: Jan. 9, 2008

(65) Prior Publication Data

US 2008/0219906 A1   Sep. 11, 2008

Related U.S. Application Data

(60) Provisional application No. 60/888,071, filed on Feb. 2, 2007.

(51) Int. Cl.
| | |
|---|---|
| B01D 53/56 | (2006.01) |
| B01D 53/62 | (2006.01) |
| B01D 53/72 | (2006.01) |
| B01D 53/94 | (2006.01) |
| B01J 23/40 | (2006.01) |
| B01J 35/00 | (2006.01) |
| F01N 3/10 | (2006.01) |
| F01N 3/28 | (2006.01) |

(52) U.S. Cl. .............. 423/213.2; 423/213.5; 423/239.1; 423/245.3; 423/247; 502/303; 502/304; 502/325; 502/527.12; 502/527.13; 60/299; 60/301; 60/302

(58) Field of Classification Search .............. 502/303, 502/304, 325, 527.12, 527.13; 423/213.2, 423/213.5, 239.1, 245.3, 247; 60/299, 301, 60/302

See application file for complete search history.

(56) References Cited

U.S. PATENT DOCUMENTS 4,171,288 A   10/1979   Keith et al.

(Continued)

FOREIGN PATENT DOCUMENTS

EP   1121981 A2   8/2001

(Continued)

OTHER PUBLICATIONS

PCT International Search Report in PCT/US2008/051304, (Aug. 7, 2008), 3 pgs.

(Continued)

*Primary Examiner*—Timothy C Vanoy
(74) *Attorney, Agent, or Firm*—Karen M. Whitney; Diehl Servilla LLC; Melanie L. Brown

(57) ABSTRACT

A multilayered, three-way conversion catalyst having the capability of simultaneously catalyzing the oxidation of hydrocarbons and carbon monoxide and the reduction of nitrogen oxides is disclosed. Provided is a catalytic material of at least four layers in conjunction with a carrier, where each of the layers includes a support, at least three layers comprise a precious metal component, and at least one layer comprises an oxygen storage component (OSC). The catalytic material can further comprise a fifth layer, where at least four layers comprise a precious metal component, at least one layer comprises an oxygen storage component, and at least one layer is substantially free of an oxygen storage component.

25 Claims, 7 Drawing Sheets

U.S. PATENT DOCUMENTS

| | | | |
|---|---|---|---|
| 4,708,946 | A | 11/1987 | Ohata et al. |
| 4,714,694 | A | 12/1987 | Wan et al. |
| 4,727,052 | A | 2/1988 | Wan et al. |
| 5,021,389 | A * | 6/1991 | Chattha et al. ............... 502/303 |
| 5,057,483 | A | 10/1991 | Wan |
| 5,422,331 | A | 6/1995 | Galligan et al. |
| 5,597,771 | A | 1/1997 | Hu et al. |
| 5,620,672 | A | 4/1997 | Galligan et al. |
| 6,478,874 | B1 | 11/2002 | Rosynsky et al. |
| 6,764,665 | B2 | 7/2004 | Deeba et al. |
| 6,921,738 | B2 | 7/2005 | Hwang et al. |
| 6,923,945 | B2 | 8/2005 | Chen |
| 7,022,646 | B2 | 4/2006 | Li |
| 7,501,098 | B2 * | 3/2009 | Chen et al. ................... 422/177 |
| 2003/0003232 | A1 | 1/2003 | Rosynsky et al. |
| 2004/0001781 | A1 | 1/2004 | Kumar et al. |
| 2005/0164879 | A1 | 7/2005 | Chen |
| 2005/0227867 | A1 * | 10/2005 | Chen et al. ................... 502/325 |
| 2007/0014705 | A1 | 1/2007 | Chen |
| 2009/0048102 | A1 * | 2/2009 | Matsubara ................... 502/304 |
| 2009/0181847 | A1 | 7/2009 | Yabuzaki et al. |
| 2009/0209408 | A1 | 8/2009 | Kitamura et al. |

FOREIGN PATENT DOCUMENTS

| | | |
|---|---|---|
| EP | 1468721 A1 | 10/2004 |
| WO | WO-95/35152 | 12/1995 |
| WO | WO-02/83301 A2 | 10/2002 |
| WO | WO-03/035256 A2 | 5/2003 |
| WO | WO-2005/099870 A2 | 10/2005 |
| WO | WO-2006/009684 A1 | 1/2006 |
| WO | WO-2008/047796 A1 | 4/2008 |
| WO | WO-2008/053690 A1 | 5/2008 |

OTHER PUBLICATIONS

PCT Written Opinion for PCT/US2008/051304, (Aug. 7, 2008), 7 pgs.

* cited by examiner

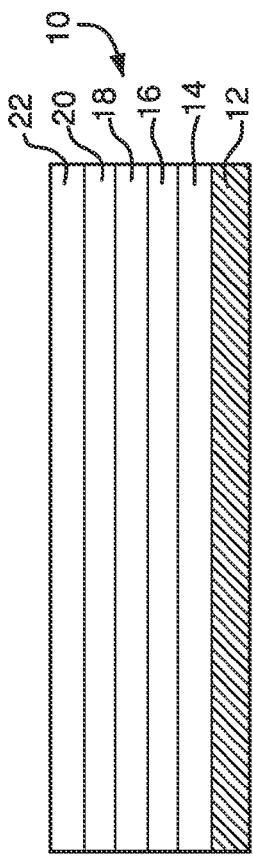
FIG. 1
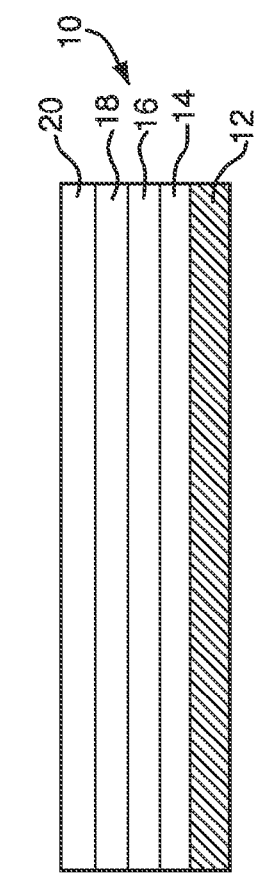
FIG. 2
| (Rh + Pt_optional)/Al/Ce |
| Pd/Al/Ce_very low |
| Pd/Al/Ce |
| Ce/Al |
FIG. 3A
| Pd/Al/Ce_very low |
| (Rh + Pt_optional)/Al/Ce |
| Pd/Al/Ce |
| Ce/Al |
FIG. 3B

| Rh/Al/Ce |
|---|
| Pd/Al |
| Pd/Al/Ce |
| Al/Ce |

FIG. 4A

| Pd/Al/Ce$_{low}$ |
|---|
| Rh/Al/Ce |
| Pd/Al |
| Al/Ce |

FIG. 4B

| Rh/Al/Ce$_{low}$ |
|---|
| Pd/Al/Ce |
| Pd/Al |
| Al |

FIG. 4C

| Rh/Al/Ce |
|---|
| Pd/Al/Ce$_{low}$ |
| Pt/Al/Ce |
| Al/Ce |

FIG. 4D

| Rh/Al/Ce$_{low}$ | Rh/Al/Ce | Pd/Al | Pd/Al/Ce | Al/Ce |

FIG. 5A

| Rh/Al/Ce | Rh/Al/Ce$_{low}$ | Pd/Al | Pd/Al/Ce | Al/Ce |

FIG. 5B

| Pd/OSC$_{low}$ | Rh/OSC$_{low}$ | Rh/OSC | Pd/OSC | Al/OSC |

FIG. 5C

| Rh/OSC$_{low}$ | Pd/OSC$_{low}$ | Rh/OSC | Pd/OSC | Al/OSC |

FIG. 5D

MULTILAYERED CATALYST COMPOSITIONS

CROSS-REFERENCE TO RELATED APPLICATIONS

This application claims the benefit of priority under 35 U.S.C. § 119(e) to U.S. Patent Application No. 60/888,071, filed Feb. 2, 2007, which is hereby incorporated by reference in its entirety.

TECHNICAL FIELD

This invention pertains generally to layered catalysts used to treat gaseous steams containing hydrocarbons, carbon monoxide, and oxides of nitrogen. More specifically, this invention is directed to three-way conversion (TWC) catalysts having multiple layers, for example, four, five, or more layers of catalytic material.

BACKGROUND

Three-way conversion (TWC) catalysts have utility in a number of fields including the treatment of exhaust gas streams from internal combustion engines, such as automobile, truck and other gasoline-fueled engines. Emission standards for unburned hydrocarbons, carbon monoxide and nitrogen oxide contaminants have been set by various governments and must be met by older as well as new vehicles. In order to meet such standards, catalytic converters containing a TWC catalyst are located in the exhaust gas line of internal combustion engines. Such catalysts promote the oxidation by oxygen in the exhaust gas stream of unburned hydrocarbons and carbon monoxide as well as the reduction of nitrogen oxides to nitrogen.

Known TWC catalysts which exhibit good activity and long life comprise one or more platinum group metals (e.g., platinum, palladium, rhodium, rhenium, and iridium) disposed on a high surface area, refractory metal oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material. TWC catalysts can be manufactured in many ways. U.S. Pat. No. 6,478,874, for example, sets forth a system for catalytic coating of a substrate. Details of a TWC catalyst are found in, for example, U.S. Pat. Nos. 4,714,694 and 4,923,842. U.S. Pat. Nos. 5,057,483; 5,597,771; 7,022,646; and WO95/35152 disclose TWC catalysts having two layers with precious metals. U.S. Pat. No. 6,764,665 discloses a TWC catalyst having three layers, two of which have precious metals.

The high surface area alumina support materials, also referred to as "gamma alumina" or "activated alumina," typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases. Refractory metal oxides other than activated alumina can be used as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

In a moving vehicle, exhaust gas temperatures can reach 1000° C., and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as barium oxide, calcia or strontia or rare earth metal oxides, such as ceria, lanthana and mixtures of two or more rare earth metal oxides. For example, see C. D. Keith et al., U.S. Pat. No. 4,171,288, the entire content of which is incorporated herein by reference.

Bulk cerium oxide (ceria) is known to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694, naming C. Z. Wan et al. as inventors and incorporated herein by reference, discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. Nos. 4,727,052 and 4,708,946, each incorporated herein by reference.

Multilayered catalysts are widely used in TWC. Generally, vehicles require catalysts having the same general overall conversion functionalities, but different vehicle platforms dictate the configurations on the catalyst of individual functions. For example, the engine control of a particular vehicle dictates whether, for example, HC or NOx conversion will be the determining factor to meet regulation targets. These critical factors lead to catalysts designed with different outermost layer favoring either HC or NOx conversion. As such, there is need to provide TWC catalysts that meet market needs, without introducing complexities into the manufacturing process. There is also a goal to utilize components of TWC catalysts, especially the precious metals, as efficiently as possible.

Multilayered catalysts are formed by deposition of washcoats onto the carriers or substrates. In some manufacturing processes, deposition of washcoats along a length of the carrier or substrate is limited. For example, sometimes a single pass of a washcoat covers less than 100% of the length of the catalyst, for example, only about 80-90%. As a result, catalyst designs have traditionally accounted for such limitations in washcoat processes, resulting in layered catalysts that are not symmetrical with respect to an axial, a radial, or both axis of the carrier or substrate. The use of asymmetrical catalysts means there is a need during, for example, manufacturing and installing to conscientiously orient these catalysts to ensure that they are properly made and effectively used. In order to reduce difficulties presented by asymmetrical catalyst composites, there is a need to provide symmetrical catalyst composites.

Further, it is a continuing goal to develop three-way conversion catalyst systems that have the ability to oxidize hydrocarbons and carbon monoxide while reducing nitrogen oxides to nitrogen.

SUMMARY

The present invention relates to a layered catalyst composite of the type generally referred to as a three-way conversion catalyst having the capability of simultaneously catalyzing the oxidation of hydrocarbons and carbon monoxide and the reduction of nitrogen oxides.

The structure of the layered catalyst composite according to one or more embodiments of the present invention is designed to have a catalytic material of at least four layers in conjunction with a carrier, where each of the layers includes a support, at least three layers comprise a precious metal component, and at least one layer comprises an oxygen storage component (OSC). In one embodiment, the catalytic material further comprises a fifth layer, where at least four layers comprise a precious metal component, at least one layer comprises an oxygen storage component, and at least one layer is substantially free of an oxygen storage component. The term "substantially free of an oxygen storage component" refers to having a low, very low amount, or no OSC in the layer. A very low amount of OSC is understood to mean less than or equal to approximately 1-4% by weight OSC in the layer. A low amount of OSC is understood to mean approximately 4-12% by weight OSC in the layer. A medium amount of OSC is understood to mean approximately 12-30% by weight OSC in the layer. A high amount of OSC is understood to mean 30% or more by weight OSC in the layer. Reference to OSC (oxygen storage component) refers to an entity that has multi-valence state and can actively react with oxidants such as oxygen or nitrous oxides under oxidative conditions, or reacts with reductants such as carbon monoxide (CO) or hydrogen under reduction conditions. Examples of suitable oxygen storage components include ceria, praseodymia, or combinations thereof. Delivery of an OSC to the layer can be achieved by the use of, for example, mixed oxides. For example, ceria can be delivered by a mixed oxide of cerium and zirconium, and/or a mixed oxide of cerium, zirconium, and neodymium. For example, praseodymia can be delivered by a mixed oxide of praseodymium and zirconium, and/or a mixed oxide of praseodymium, cerium, lanthanum, yttrium, zirconium, and neodymium.

In one or more embodiments, one layer of the catalytic material is deposited on the carrier to form an undercoat. A first middle layer is deposited on the undercoat layer, a second middle layer is deposited on the first middle layer, and an outer layer is deposited above, but not necessarily directly upon, the second middle layer. An optional third middle layer is deposited on the second middle layer and below the outer layer.

Another aspect of the present invention includes a method for treating an exhaust gas of a mobile source comprising: contacting a gaseous stream comprising hydrocarbons, carbon monoxide, and nitrogen oxides with a layered catalyst composite comprising a catalytic material on a carrier, the catalytic material comprising at least four layers, each of the layers including a support, wherein at least three layers comprise a precious metal component on the supports of each of the at least three layers, at least one layer comprises an oxygen storage component, and wherein the catalytic material is effective to substantially simultaneously oxidize the carbon monoxide and the hydrocarbons and reduce the nitrogen oxides. In one embodiment, the catalytic material further comprises a fifth layer, at least four layers comprise a precious metal component, and at least one layer is substantially free of an oxygen storage component.

Another aspect includes methods comprising locating in an exhaust system a multi-layered catalyst composite having a catalytic material on a carrier, the catalytic material comprising at least four layers, each of the layers including a support, wherein at least three layers comprise a precious metal component on the supports of each of the at least three layers, at least one layer comprises an oxygen storage component, and wherein the catalytic material is effective to substantially simultaneously oxidize the carbon monoxide and the hydrocarbons and reduce the nitrogen oxides.

BRIEF DESCRIPTIONS OF DRAWINGS

FIG. 1 is a schematic view showing a configuration of layers on a catalytic member of an exhaust gas treatment system having four layers for three-way catalyst activity according to an embodiment of the present invention;

FIG. 2 is a schematic view showing another configuration of layers on a catalytic member having five layers according to an embodiment of the present invention;

FIGS. 3A and 3B are schematic views showing four layer configurations according to certain embodiments of the present invention;

Figure 6:
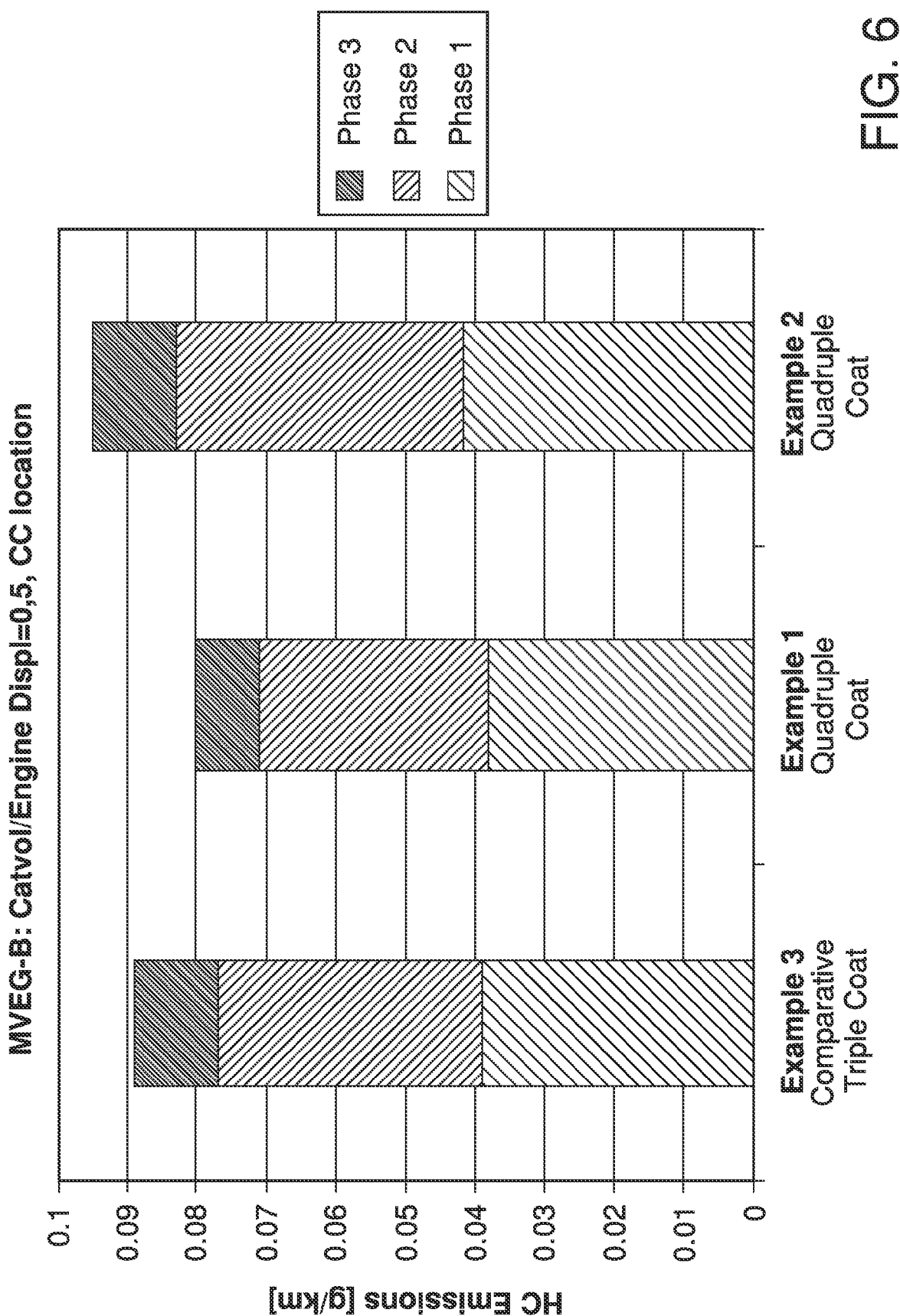
Figure 7:
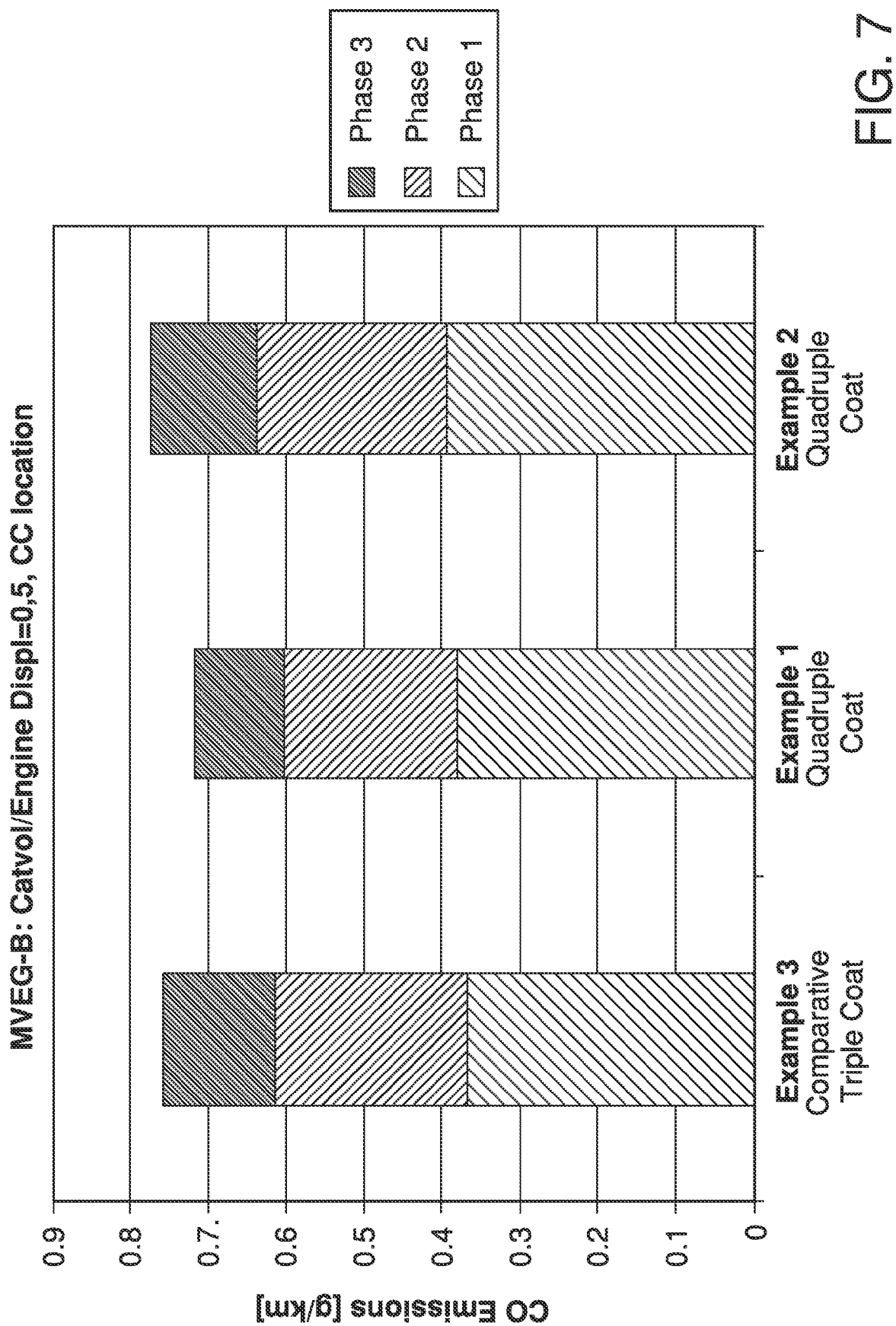
Figure 8:
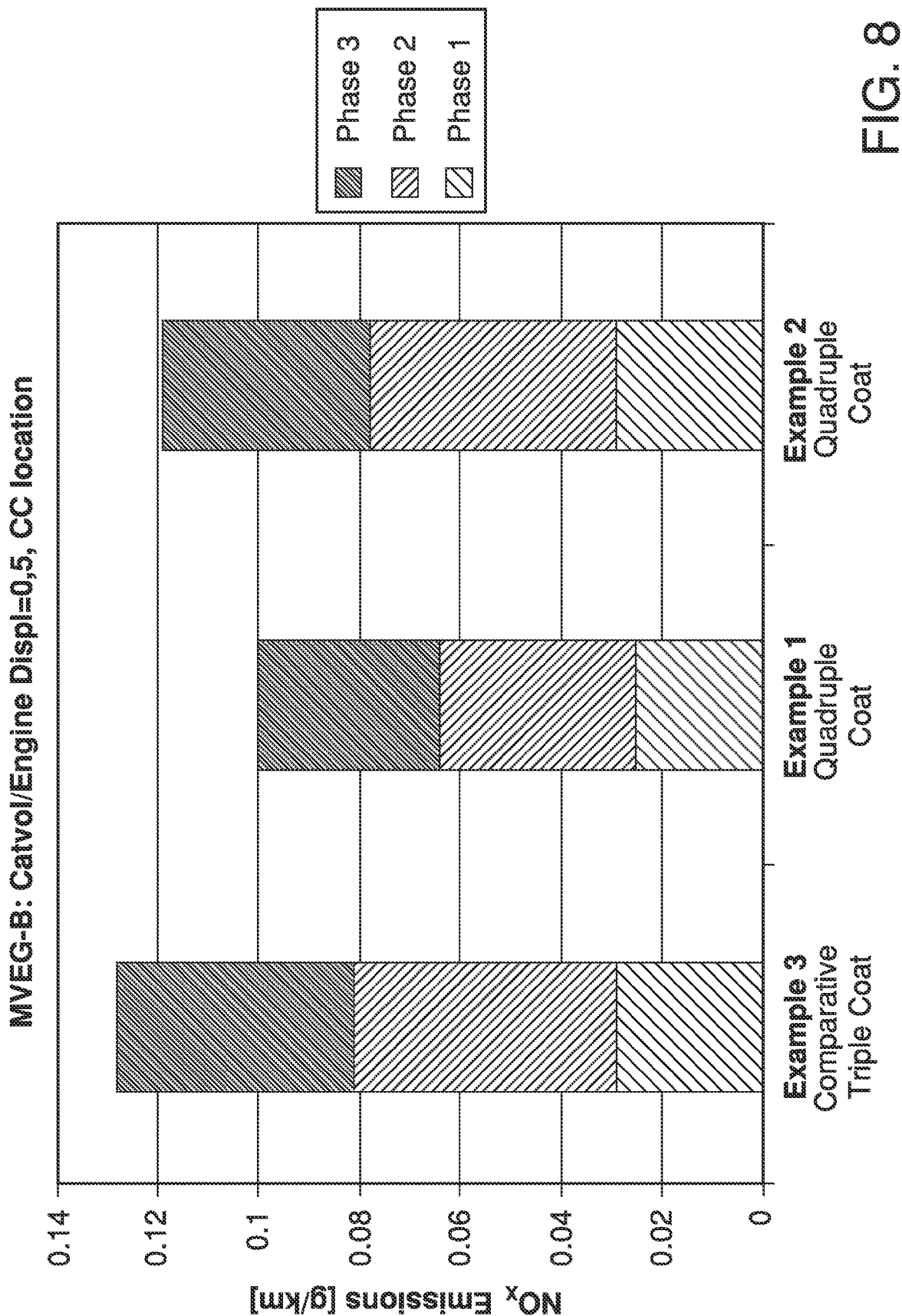
Figure 9:
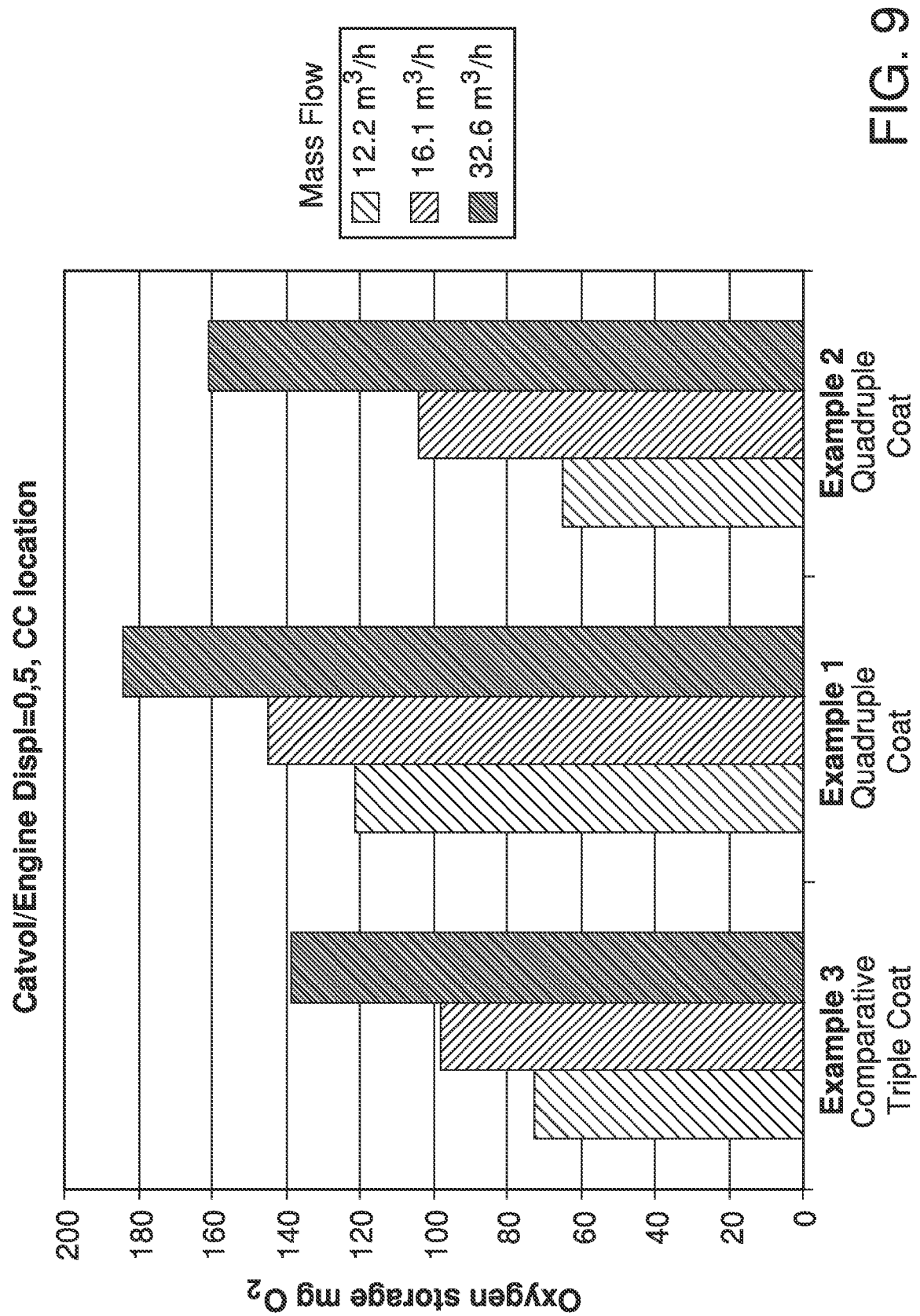

FIGS. 4A, 4B, 4C, and 4D are schematic views showing other four layer configurations according to several embodiments of the present invention;

FIGS. 5A, 5B, 5C, and 5D are schematic views showing other five layer configurations according to certain embodiments of the present invention;

FIG. 6 depicts HC emissions during MVEG-B testing of two embodiments of the present invention and a comparative example;

FIG. 7 depicts CO emissions during MVEG-B testing of two embodiments of the present invention and a comparative example;

FIG. 8 depicts $NO_x$ emissions during MVEG-B testing of two embodiments of the present invention and a comparative example; and FIG. 9 depicts oxygen storage capacity of two embodiments of the present invention and a comparative example.

DETAILED DESCRIPTION

The present invention relates to a layered catalyst composite of the type generally referred to as a three-way conversion catalyst having the capability to simultaneously catalyze the oxidation of hydrocarbons and carbon monoxide and the reduction of nitrogen oxides. With reference to FIG. 1, the structure of the layered catalyst composite 10 according to one or more embodiments of the present invention is designed to have a catalytic material of at least four layers 14, 16, 18, 20 in conjunction with a carrier 12, where each of the layers includes a support, at least three layers comprise a precious metal component, and at least one layer comprises an oxygen storage component (OSC). In one embodiment, with reference to FIG. 2, in addition to the carrier 12 and the four layers 14, 16, 18, 20, the catalytic material further comprises a fifth layer 22, where at least four layers comprise a precious metal component, at least one layer comprises an oxygen storage component, and at least one layer is substantially free of an oxygen storage component. A suitable support according to one or more embodiments is a refractory oxide support. In one embodiment, the precious metal loading of the catalyst composite is approximately 350 g/ft$^3$ or less. In a detailed embodiment, each layer of the catalytic material comprises a different composition. In a further embodiment, each layer has a loading of from approximately 0.2 g/in$^3$ to approximately 2.5 g/in$^3$. In a specific embodiment, each of the layers is deposited at a loading of about 0.5 to about 1.5 g/in$^3$.

By reference to first, second, third, fourth, and fifth layers, no limitation is being placed on the location of the layer. Locations of the layers are described by inner, first middle, second middle, third middle, and outer layers. In one or more embodiments, one layer of the catalytic material is deposited on the carrier to form an undercoat. A first middle layer is deposited on the undercoat layer, a second middle layer is deposited on the first middle layer, and an outer layer is deposited above, but not necessarily directly upon, the second middle layer. An optional third middle layer is deposited on the second middle layer and below the outer layer.

Segregated washcoats that address certain catalytic functionalities can be used. Creating washcoat slurries using standard stock amounts across technologies, and layering as needed, permits a reduction in slurry inventories while tailoring TWC catalysts to market needs. Further, the use of at least four or five layers on a carrier can lead to more efficient use of and/or to a decrease in overall amount of, for example, precious metals due to their separation from one another.

In one or more embodiments, the compositions of each layer are tailored to address a particular function of the TWC catalyst. For example, a specific inner layer is an undercoat (UC) layer, which comprises a support such as alumina. An UC layer is deposited on a carrier and primarily serves to fill corners of the carrier. Such a layer can also be used to reduce silica poisoning with silica derived from cordierite substrate. Also, inner layers, in general, and undercoats, specifically, are useful for hosting one or more oxygen storage components. In one embodiment, the undercoat layer is substantially free of precious metals. Reference to "substantially free of precious metals" means that precious metals may be present at a level of less than or equal to approximately 100 ppm. In another embodiment, an OSC is provided in the undercoat. In a further embodiment, the undercoat is substantially free of an OSC. Other embodiments can provide one or more SO$_x$ traps in the undercoat.

Overcoat layers that are substantially free of precious metals and that comprise alumina and one or more base metal oxides (BMOs) are, for example, effective to trap poisons such as sulfur-, nitrogen-, and phosphorous-containing components. Examples of BMOs include, but are not limited to SrO, La$_2$O$_3$, Nd$_2$O$_3$, or BaO.

Layers having one or more precious metals such as platinum, rhodium, and/or palladium and being substantially free of an OSC are primarily effective to oxidize hydrocarbons. Such layers can also manage transient emissions.

Layers having a precious metal such as platinum, rhodium, and/or palladium in conjunction with an OSC are primarily effective to reduce NO$_x$ and oxidize CO and to a lesser extent, oxidizing hydrocarbons. Layers having an OSC amount of approximately 30% or more, for example, up to 80%, by weight of the layer are useful in converting CO. Layers having an OSC amount of from approximately 12% to approximately 30% are useful in converting NO$_x$. Layers having an OSC amount of from approximately 3-4% to approximately 12% show benefits for hydrocarbon conversion and some NO$_x$ and CO conversions. Moreover, such layers can also help to manage hot performance.

According to certain embodiments of the present invention, at least two layers comprise an oxygen storage component. In a detailed embodiment, at least three layers comprise an oxygen storage component. In another detailed embodiment, at least four layers comprise an oxygen storage component. One or more embodiments provide that the oxygen storage component of the layers independently comprises ceria, praseodymia, or combinations thereof.

In one or more embodiments, an amount of oxygen storage component in a layer is from approximately 3% to approximately 80% by weight of the layer. According to certain embodiments, ceria content of certain delivery components is from 3% to 98%. Delivery component may comprise one or more reducible oxides of one or more rare earth metals selected from the group consisting of ceria, a mixed oxide of cerium and zirconium and a mixed oxide of cerium, zirconium, praseodymium, lanthanum, yttrium, samarium, gadollium, dysprosium, ytterbium, niobium, and neodymium.

A specific embodiment provides an undercoat layer comprising from approximately 30% to approximately 35% of a first oxygen storage component by weight of the layer, the first middle layer comprising from approximately 20% to approximately 25% of a second oxygen component by weight of the layer, the second middle layer comprising from approximately 15% to approximately 20% of a third oxygen storage component by weight of the layer, and the outer layer comprises from approximately 3.5% to approximately 6.5% of a fourth oxygen storage component by weight of the layer. Another specific embodiment provides an undercoat layer comprising from approximately 30% to approximately 35% of a first oxygen storage component by weight of the layer, the first middle layer comprising from approximately 20% to approximately 25% of a second oxygen component by weight of the layer, the second middle layer comprising from approximately 3.5% to approximately 6.5% of a third oxygen storage component by weight of the layer, and the outer layer comprises from approximately 15% to approximately 20% of a fourth oxygen storage component by weight of the layer.

In a further embodiment, the second middle layer comprises from approximately 15% to approximately 20% of an oxygen storage component by weight of the layer. In still another embodiment, the undercoat layer comprises from approximately 18% to approximately 23% of an oxygen storage component by weight of the layer, the second middle layer comprises from approximately 15% to approximately 20% of an oxygen storage component by weight of the layer, and the outer comprises from approximately 19% to approximately 24% of an oxygen storage component by weight of the layer.

According to certain embodiments of the present invention, at least one layer is substantially free an oxygen storage component. In a detailed embodiment, at least two layers are substantially free of an oxygen storage component. In another detailed embodiment, at least three layers are free of an oxygen storage component. A further specific embodiment provides at least four layers that are free of an oxygen storage component.

In one or more embodiments, the precious metal component of the at least three layers independently comprises platinum, palladium, rhodium, or combinations thereof. In further embodiments, the precious metal component of the at least four layers independently comprises platinum, palladium, rhodium, or combinations thereof. In one or more embodiments, an amount of precious metal in a layer is up to about 150 g/ft$^3$. In certain embodiments, the amount of rhodium in a layer is from about 1 to about 15 g/ft$^3$. In certain embodiments, the amount of palladium in a layer is from about 10 to about 150 g/ft$^3$.

Reference to a "support" in a catalyst layer refers to a material onto or into which precious metals, stabilizers, promoters, binders, and the like are dispersed or impregnated, respectively. A support can be activated and/or stabilized as desired. Examples of supports include, but are not limited to, high surface area refractory metal oxides, composites containing oxygen storage components, and molecular sieves. One or more embodiments provide that the support of each layer independently comprises a compound that is activated, stabilized, or both selected from the group consisting of, but not limited to, alumina, silica, silica-alumina, alumino-silicates, alumina-zirconia, lanthana-alumina, lanthana-zirconia-alumina, baria-alumina, baria lanthana-alumina, alumina-chromia, and alumina-ceria. The support may comprise any suitable materials, for example, a metal oxide comprising γ-alumina or promoter-stabilized γ-alumina having a specific surface area of about 50 to 300 $m^2/g$. In certain embodiments, the alumina present in any of the layers comprises zirconia- and lanthana-stabilized γ-alumina in a loading of about 0.2 to about 2.0 $g/in^3$. For example, a suitable alumina is about 0.1-15% lanthana and about 2-25%, and specifically 8-20%, zirconia-stabilized gamma alumina. In one or more embodiments, the alumina comprises gamma alumina stabilized by barium oxide, neodymia, lanthana and combinations thereof. An example of a suitable alumina is about 4% barium oxide and about 4% lanthana stabilized alumina.

In one or more embodiments, a molecular sieve material can be selected from the group consisting of faujasite, chabazite, silicalite, zeolite X, zeolite Y, ultrastable zeolite Y, offretite, and Beta zeolites. In particular, ion-exchanged Beta zeolites may be used, such as Fe/Beta zeolite, or specifically, H/Beta zeolite. The zeolites, preferably Beta zeolites may have a silica/alumina molar ratio of from at least about 25/1 or at least about 50/1, with useful ranges of from about 25/1 to 1000/1, 50/1 to 500/1 as well as about 25/1 to 300/1 for example, from about 100/1 to 250/1, or alternatively from about 35/1 to 180/1. Other useful silica to alumina molar ratios for zeolites are at least 200/1 with more specific ratios of from about 200/1 to about 1000/1, and Beta zeolite ratio ranges from about 200/1 to about 600/1.

With reference to FIGS. 3A and 3B, examples of four layer configurations according to certain embodiments of the present invention are provided. An undercoat, "UC", comprises a support such as alumina. FIG. 3A provides catalytic material having an undercoat layer comprising ceria and alumina; a first middle layer comprising palladium, alumina, and ceria; a second middle layer comprising palladium, alumina, and a very low amount of ceria; and an outer layer comprising rhodium, alumina, and ceria. Platinum may optionally be added to the outer layer of FIG. 3A. FIG. 3B provides catalytic material having an undercoat layer comprising ceria and alumina; a first middle layer comprising palladium, alumina, and ceria; a second middle layer comprising rhodium, alumina, and ceria; and an outer layer comprising palladium, and a very low amount of ceria. Platinum may optionally be added to the second middle layer of FIG. 3B.

With reference to FIGS. 4A, 4B, 4C, and 4D, other examples of four layer configurations according to several other embodiments of the present invention are provided. FIG. 4A provides catalytic material having an undercoat layer comprising alumina and ceria; a first middle layer comprising palladium, alumina, and ceria; a second middle layer comprising palladium and alumina; and an outer layer comprising rhodium, alumina, and ceria. FIG. 4B provides catalytic material having an inner layer comprising alumina and ceria; a first middle layer comprising palladium and alumina; a second middle layer comprising rhodium, alumina, and ceria; and an outer layer comprising palladium and alumina. FIG. 4C provides catalytic material having an undercoat layer comprising alumina; a first middle layer comprising palladium and alumina; a second middle layer comprising palladium, alumina, and ceria; and an outer layer comprising rhodium, alumina, and a low amount of ceria, and alumina. FIG. 4D provides catalytic material having an undercoat layer comprising alumina and ceria; a first middle layer comprising platinum, alumina, and ceria; a second middle layer comprising palladium, alumina; and a low amount of ceria; and an outer layer comprising rhodium, alumina, and ceria.

With reference to FIGS. 5A, 5B, 5C, and 5D, examples of five layer configurations according to certain embodiments of the present invention are provided. FIG. 5A provides catalytic material having an undercoat layer comprising alumina and ceria; a first middle layer comprising palladium, alumina, and ceria; a second middle layer comprising palladium and alumina; a third middle layer comprising rhodium, alumina, and ceria, and an outer layer comprising rhodium, alumina, and a low amount of ceria. FIG. 5B provides catalytic material having an undercoat layer comprising alumina and ceria; a first middle layer comprising palladium, alumina, and ceria; a second middle layer comprising palladium and alumina; a third middle layer comprising rhodium, alumina, and a low amount of ceria; and an outer layer comprising rhodium, alumina, and ceria. FIG. 5C provides catalytic material having an undercoat layer comprising alumina and OSC; a first middle layer comprising palladium and OSC; a second middle layer comprising rhodium and OSC; a third middle layer comprising rhodium and low OSC; and an outer layer comprising palladium and low OSC. FIG. 5D provides catalytic material having an undercoat layer comprising alumina and OSC; a first middle layer comprising palladium and OSC; a second middle layer comprising rhodium and OSC; a third middle layer comprising palladium and low OSC; and an outer layer comprising rhodium and low OSC.

In a specific embodiment, it may be desirable that a given layer further comprise up to about 0.65 $g/in^3$ of a promoter/stabilizer comprising one or more non-reducible metal oxides wherein the metal is selected from the group consisting of barium, calcium, magnesium, strontium, and mixtures thereof. A layer may further comprise, according to one embodiment, 0 to about 0.65 $g/in^3$ of one or more promoters comprising one or more rare earth metals selected from the group consisting of lanthanum, praseodymium, yttrium, zirconium, samarium, gadolium, dysprosium, ytterbium, niobium, neodymium, and mixtures thereof.

Another aspect of the present invention includes a method for treating an exhaust gas of a mobile source comprising: contacting a gaseous stream comprising hydrocarbons, carbon monoxide, and nitrogen oxides with a layered catalyst composite comprising a catalytic material on a carrier, the catalytic material comprising at least four layers, each of the layers including a support, wherein at least three layers comprise a precious metal component on the supports of each of the at least three layers, at least one layer comprises an oxygen storage component, and wherein the catalytic material is effective to substantially simultaneously oxidize the carbon monoxide and the hydrocarbons and reduce the nitrogen oxides. In one embodiment, the catalytic material further comprises a fifth layer, at least four layers comprise a precious metal component, and at least one layer is substantially free of an oxygen storage component.

A further aspect of the present invention includes a method comprising locating in an exhaust system a multi-layered catalyst composite having a catalytic material on a carrier, the catalytic material comprising at least four layers, each of the layers including a support, wherein at least three layers comprise a precious metal component on the supports of each of the at least three layers, at least one layer comprises an oxygen storage component, and wherein the catalytic material is effective to substantially simultaneously oxidize the carbon monoxide and the hydrocarbons and reduce the nitrogen oxides. In one embodiment, the catalytic material further comprises a fifth layer, at least four layers comprise a precious metal component, and at least one layer is substantially free of an oxygen storage component.

In a detailed embodiment, an outer layer and a second middle layer each comprises rhodium, wherein one of the outer layer or the second middle layer is substantially free of an oxygen storage component while the other of the second middle layer or the outer layer contains an oxygen storage component.

Another detailed embodiment provides that one of an outer layer or a second middle layer comprises rhodium or palladium, and the other of the second middle layer or the outer layer comprises palladium or rhodium, and wherein one of the outer layer or the second middle layer is substantially free of an oxygen storage component while the other of the second middle layer or the outer layer contains an oxygen storage component.

A further embodiment provides that an outer layer and a second middle layer each comprises palladium, wherein one of the outer layer or the second middle layer is substantially free of an oxygen storage component while the other of the second middle layer or the outer layer contains an oxygen storage component.

One or more embodiments provide that the outer layer or the second middle layer or both further comprises platinum.

Another aspect of the invention pertains to an exhaust gas treatment article comprising a substrate comprising an inlet axial end, an outlet axial end, wall elements having a length extending between the inlet axial end to the outlet axial end and a plurality of axially enclosed channels defined by the wall elements; and an inlet composite catalyst deposited on the wall elements adjacent the inlet axial end and having a length extending less than the wall length of the wall elements, wherein the inlet catalyst composite comprises the catalyst composite described immediately above.

The Carrier

In one or more embodiments, one or more catalyst compositions are disposed on a carrier. The carrier may be any of those materials typically used for preparing catalysts, and will preferably comprise a ceramic or metal honeycomb structure. Any suitable carrier may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

The carrier can also be a wall-flow filter substrate, where the channels are alternately blocked, allowing a gaseous stream entering the channels from one direction (inlet direction), to flow through the channel walls and exit from the channels from the other direction (outlet direction). A dual oxidation catalyst composition can be coated on the wall-flow filter. If such a carrier is utilized, the resulting system will be able to remove particulate matters along with gaseous pollutants. The wall-flow filter carrier can be made from materials commonly known in the art, such as cordierite or silicon carbide.

The ceramic carrier may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alumina, an aluminosilicate and the like.

The carriers useful for the catalysts of the present invention may also be metallic in nature and be composed of one or more metals or metal alloys. The metallic carriers may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt % of the alloy, e.g., 10-25 wt % of chromium, 3-8 wt % of aluminum and up to 20 wt % of nickel. The alloys may also contain small or trace amounts of one or more other metals such as manganese, copper, vanadium, titanium and the like. The surface of the metal carriers may be oxidized at high temperatures, e.g., 1000° C. and higher, to improve the resistance to corrosion of the alloys by forming an oxide layer on the surfaces of the carriers. Such high temperature-induced oxidation may enhance the adherence of the refractory metal oxide support and catalytically promoting metal components to the carrier.

In alternative embodiments, one or more catalyst compositions may be deposited on an open cell foam substrate. Such substrates are well known in the art, and are typically formed of refractory ceramic or metallic materials.

Preparation of the Layered Catalyst Composite

The layered catalyst composite of the present invention may be readily prepared by processes well known in the prior art, see for example U.S. Patent Publication No. 2004/0001782, incorporated herein by reference in its entirety. A representative process is set forth below. As used herein, the term "washcoat" has its usual meaning in the art of a thin, adherent coating of a catalytic or other material applied to a substrate carrier material, such as a honeycomb-type carrier member, which is sufficiently porous to permit the passage there through of the gas stream being treated.

The catalyst composite can be readily prepared in layers on a monolithic carrier. For a first layer of a specific washcoat, finely divided particles of a high surface area refractory metal oxide such as gamma alumina are slurried in an appropriate vehicle, e.g., water. The carrier may then be dipped one or more times in such slurry or the slurry may be coated on the carrier such that there will be deposited on the carrier the desired loading of the metal oxide, e.g., about 0.5 to about 2.5 g/in$^3$. To incorporate components such as precious metals (e.g., palladium, rhodium, platinum, and/or combinations of the same), stabilizers and/or promoters, such components may be incorporated in the slurry as a mixture of water soluble or water-dispersible compounds or complexes. Thereafter the coated carrier is calcined by heating, e.g., at 500-600° C. for about 1 to about 3 hours. Typically, when palladium is desired, the palladium component is utilized in the form of a compound or complex to achieve dispersion of the component on the refractory metal oxide support, e.g., activated alumina. For the purposes of the present invention, the term "palladium component" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are utilized. For example, suitable compounds are palladium nitrate or rhodium nitrate. During the calcination step, or at least during the initial phase of use of the composite, such compounds are converted into a catalytically active form of the metal or a compound thereof.

A suitable method of preparing any layer of the layered catalyst composite of the invention is to prepare a mixture of a solution of a desired precious metal compound (e.g., palladium compound or palladium and platinum compounds) and at least one finely divided, high surface area, refractory metal oxide support, e.g., gamma alumina, which is sufficiently dry to absorb substantially all of the solution to form a wet solid which later combined with water to form a coatable slurry. In one or more embodiments, the slurry is acidic, having a pH of about 2 to less than about 7. The pH of the slurry may be lowered by the addition of a minor amount of an inorganic or an organic acid to the slurry. Inorganic acids include, but are not limited to, nitric acid. Organic acids include, but are not limited to, as acetic acid or polyacids, specifically difunctional acids, more specifically dicarboxylic acids. Dicarboxylic acids include, but are not limited to oxalic, malonic, succinic, glutaric, adipic, maleic, fumaric, phthalic, tartaric, and the like. Combinations of both organic and inorganic acids can be considered when amounts of each are desired. Thereafter, if desired, water-soluble or water-dispersible compounds of oxygen storage components, e.g., cerium-zirconium composite, a stabilizer, e.g., barium acetate, and a promoter, e.g., lanthanum nitrate, may be added to the slurry.

In one embodiment, the slurry is thereafter comminuted to result in substantially all of the solids having particle sizes of less than about 20 microns, i.e., between about 0.1-15 microns, in an average diameter. The comminution may be accomplished in a ball mill or other similar equipment, and the solids content of the slurry may be, e.g., about 15-60 wt. %, more particularly about 25-40 wt. %.

Additional layers, i.e., the second, third, fourth, and fifth layers may be prepared and deposited upon the first layer in the same manner as described above for deposition of the first layer upon the carrier.

Before describing several exemplary embodiments of the invention, it is to be understood that the invention is not limited to the details of construction or process steps set forth in the following description. The invention is capable of other embodiments and of being practiced in various ways.

EXAMPLES

The following non-limiting examples shall serve to illustrate the various embodiments of the present invention. In each of the examples, the carrier was cordierite.

Example 1

A composite having a catalytic material was prepared using four layers: an inner layer, a first middle layer, a second middle layer, and an outer layer. In this example, the composition is generally referred to as UC/Pd/(Pt+Rh)/Pd (where UC refers to "undercoat"). The layered catalyst composite contained palladium, platinum, and rhodium with a total precious metal loading of 92 g/ft$^3$ and with a Pt/Pd/Rh ratio of 1/88/3. The substrate was 0.55 liter volume, with a cell density of 600 cells per square inch and with wall thickness around 75 μm. The layers were prepared as follows:

Inner Layer

The components present in the inner layer were high surface area gamma alumina, a cerium and zirconium oxide composite with approximately 45% ceria content, zirconium oxide, and alumina oxide at concentrations of approximately 23.3%, 69.8%, 4.7%, and 2.3%, respectively, based on the calcined weight of the catalyst layer. The total loading of the inner layer was 1.075 g/in$^3$. The zirconium oxide and alumina oxide were introduced as colloidal solutions to promote binding. An aqueous slurry around 45% solid content was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried for 1-2 hours at a temperature of 110° C., and then were calcined at a temperature of 500° C. for about 1 hour.

First Middle Layer

The components present in the first middle layer were a first high surface area lanthana-stabilized gamma alumina, a second high surface area lanthana-stabilized gamma alumina, a first cerium and zirconium oxide composite with approximately 45% ceria content, a second cerium and zirconium oxide composite with approximately 28% ceria content, palladium, and barium oxide, at concentrations of 17.4%, 17.4%, 29.1%, 29.1%, 1.2%, and 5.8%, respectively, based on the calcined weight of the catalyst layer. The total loading of the first middle layer was 1.72 g/in$^3$. The aluminas were mixed. Palladium in the form of a palladium nitrate solution was impregnated by planetary mixer (P-mixer) onto the stabilized aluminas to form a wet powder while achieving incipient wetness. The barium oxide was introduced as a colloidal solution. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and first middle layers were dried, and then calcined at a temperature of 550° C. for about 1 hour.

Second Middle Layer

The components present in the second middle layer were high surface area zirconia-stabilized gamma alumina, a first cerium and zirconium oxide composite with approximately 45% ceria content, a second cerium and zirconium oxide composite with approximately 45% ceria content, platinum, rhodium, zirconium oxide, and barium oxide, at concentrations of 56.5%, 18.8%, 18.8%, 0.1%, 0.2%, 4.7%, and 0.9% based on the calcined weight of the catalyst layer. The total loading of the second middle layer was 1.062 g/in$^3$. The rhodium in the form of a rhodium nitrate solution was impregnated by planetary mixer (P-mixer) onto the stabilized alumina to form a wet powder while achieving incipient wetness. The zirconium oxide and barium oxide were introduced as colloidal solutions. An aqueous slurry was formed by combining all of the above components with water, and milling to a particle size of 90% less than 12 microns. The platinum in the form of an amine hydroxide solution was mixed into the slurry. The slurry was then milled to a particle size of 90% less than 10 microns. The slurry was coated onto the cordierite carrier over the first middle layer using deposition methods known in the art for depositing the catalyst on a cordierite substrate. After coating, the carrier plus the inner, first middle, and second middle layers were dried, and then calcined at a temperature of 500° C. for about 1 hour.

Outer Layer

The components present in the outer layer were high surface area zirconia-stabilized gamma alumina, a cerium and zirconium oxide composite with approximately 28% ceria content, palladium, zirconium oxide, barium oxide, and alumina oxide, at concentrations of 70.5%, 13.2%, 2.7%, 2.2%, 7%, and 4.4% based on the calcined weight of the catalyst. The total loading of the outer layer was 1.136 g/in$^3$. The palladium in the form of a palladium nitrate solution was impregnated by planetary mixer (P-mixer) onto the stabilized alumina and onto the cerium and zirconium oxide composite to form a wet powder while achieving incipient wetness. The alumina oxide and barium oxide were introduced as colloidal solutions. An aqueous slurry was formed by combining all of the above components with water and milling to a particle size of 90% less than 10 microns. The slurry was coated onto the cordierite carrier over the second middle layer using deposition methods known in the art for depositing the catalyst on a cordierite substrate. After coating, the carrier plus the inner, first middle, second middle, and outer layers were dried, and then calcined at a temperature of 550° C. for about 1 hour.

Example 2

A composite having a catalytic material was prepared using four layers: an inner layer, a first middle layer, a second middle layer, and an outer layer. In this example, the composition is generally referred to as UC/Pd/Pd/(Pt+Rh). The layers were prepared as follows:

Inner Layer

The inner layer was prepared as described for the inner layer of Example 1.

First Middle Layer

The first middle layer was prepared as described for the first middle layer of Example 1

Second Middle Layer

The second middle layer had the same composition and slurry preparation as the outer layer of Example 1. The slurry was coated onto the cordierite carrier over the first middle layer using deposition methods known in the art for depositing the catalyst on a cordierite substrate. After coating, the carrier plus the inner, first middle, and second middle layers were dried, and then calcined at a temperature of 550° C. for about 1 hour.

Outer Layer

The outer layer had the same composition and slurry preparation as the second middle layer of Example 1. The slurry was coated onto the cordierite carrier over the second middle layer using deposition methods known in the art for depositing the catalyst on a cordierite substrate. After coating, the carrier plus the inner, first middle, second middle, and outer layers were dried, and then calcined at a temperature of 500° C. for about 1 hour.

Example 3

Comparative Example

A composite having a catalytic material was prepared using three layers: an inner layer, a middle layer, and an outer layer, which together have approximately the same loading of material on the carrier and approximately the same loadings of individual components, e.g., alumina, palladium, rhodium, ceria, as described in Examples 1 and 2. The layered catalyst composite contained palladium, platinum, and rhodium with a total precious metal loading of 92 g/ft$^3$ and with a Pt/Pd/Rh ratio of 1/88/3. The substrate was 0.55 liter volume, with a cell density of 600 cells per square inch and with wall thickness around 75 µm. In this comparative example, the composition is generally referred to as UC/Pd/(Pt+Rh) The layers were prepared as follows:

Inner Layer

The components present in the inner layer were high surface area gamma alumina, a cerium and zirconium oxide composite with approximately 45% ceria content, zirconium oxide, and alumina oxide, at concentrations of 31.6%, 63.2%, 3.5%, and 1.8% based on the calcined weight of the catalyst. The total loading of the inner layer was 1.425 g/in$^3$. The zirconium oxide and alumina oxide were introduced as colloidal solutions to promote binding. An aqueous slurry was formed by combining all of the above components with water, and milling to a particle size of 90% less than 10 microns. The slurry was coated onto a cordierite carrier using deposition methods known in the art for depositing the catalyst on a cordierite substrate. After coating, the carrier plus the inner layer were dried for 1-2 hours at a temperature of 110° C., and then were calcined at a temperature of 500° C. for about 1 hour.

Middle Layer

The components present in the middle layer were high surface area lanthana-stabilized gamma alumina, a cerium and zirconium oxide composite with approximately 45% ceria content, a cerium and zirconium oxide composite with approximately 28% ceria content, palladium, and barium oxide, at concentrations of 51.3%, 20.5%, 20.5%, 2.6%, and 5.1%, respectively, based on the calcined weight of the washcoat. The total loading of the middle layer was 1.951 g/in$^3$. Palladium in the form of a palladium nitrate solution was impregnated by planetary mixer (P-mixer) onto the stabilized aluminas to form a wet powder while achieving incipient wetness. The barium oxide was introduced as a colloidal solution. An aqueous slurry was formed by combining all of the above components with water, and milling to a particle size of 90% less than 10 microns. The slurry was coated onto the cordierite carrier over the inner layer using deposition methods known in the art for depositing the catalyst on a cordierite substrate. After coating, the carrier plus the inner and middle layers were dried, and then calcined at a temperature of 550° C. for about 1 hour.

Outer Layer

The components present in the outer layer were high surface area zirconia-stabilized gamma alumina, a first cerium and zirconium oxide composite with approximately 45% ceria content, a second cerium and zirconium oxide composite with approximately 45% ceria content, platinum, rhodium, zirconium oxide, and barium oxide, at concentrations of 66.2%, 15%, 15%, <0.05%, 0.1%, 3%, and 0.6%, respectively, based on the calcined weight of the catalyst. The total loading of the outer layer was 1.662 g/in$^3$. The rhodium in the form of a rhodium nitrate solution was impregnated by planetary mixer (P-mixer) onto the stabilized alumina to form a wet powder while achieving incipient wetness. The zirconium oxide and barium oxide were introduced as colloidal solutions. An aqueous slurry was formed by combining all of the above components with water, and milling to a particle size of 90% less than 12 microns. The platinum in the form of an amine hydroxide solution was then mixed into the slurry. The slurry was then milled to a particle size of 90% less than 10 microns. The slurry was coated onto the cordierite carrier over the middle layer using deposition methods known in the art for depositing the catalyst on a cordierite substrate. After coating, the carrier plus the inner, middle, and outer layers were dried, and then calcined at a temperature of 500° C. for about 1 hour.

Example 4

Testing

The catalyst composites prepared in Examples 1, 2, and 3 were simultaneously engine-aged with exothermic aging resulting in bed temperatures of approximately 1050° C. for 80 hours. After aging, the composites were evaluated on an engine dynamometer pursuant to standard test MVEG-B. Phase 1, 2, and 3 bag emissions were analyzed.

FIGS. 6, 7, and 8 show that the four-layered UC/Pd/(Pt+Rh)/Pd composite of Example 1 showed improved conversions of HC, CO, and NO$_x$, respectively, compared to the three-layered UC/Pd/Rh composite of Example 3. The four-layered UC/Pd/Pd/(Pt+Rh) composite of Example 2 showed improved conversions of NO$_x$ compared to the three-layered UC/Pd/(Pt+Rh) composite of Example 3. FIG. 9 shows that the four-layered catalysts of Examples 1 and 2 show improved oxygen storage capacity, particularly at higher mass flow, than comparative Example 3.

Example 5

A composite having a catalytic material was prepared using four layers: an inner layer, a first middle layer, a second middle layer, and an outer layer. In this example, the composition is generally referred to as UC'/Pd'/Pd/Rh', where the designation of "'", for this and subsequent examples, indicates more than a low or very low amount of OSC, e.g., ceria, is present in the layer. The layered catalyst composite contained palladium and rhodium with a total precious metal loading of 84 g/ft$^3$ and with a palladium to rhodium ratio of 6:1. The substrate was 1 liter volume, with a cell density of 400 cells per square inch and with wall thickness around 88 µm. The layers were prepared as follows:

Inner Layer

The components present in the inner layer were high surface area stabilized gamma alumina, a composite of ceria and zirconium oxide with ~36% ceria content, zirconium oxide, and aluminum oxide at concentrations of 33%, 58%, 5%, and 4%, respectively, based on the calcined weight (68 g) of the washcoat. The total loading of the layer was 1.13 g/in$^3$. The zirconium oxide and alumina oxide were introduced as colloidal solutions to promote binding. An aqueous slurry around 44% solid content and pH around 4.5 was formed by combining all above components and milled to a particle size of 90% less than 10 microns and coated onto the cordierite carrier. After coating, the carrier plus the inner layer were calcined at a temperature of 430° C. for at least 2 hours.

First Middle Layer

The components present in the first middle layer were high surface area lanthana-stabilized gamma alumina, barium oxide, a mixed oxide of cerium and zirconium with ~36% ceria, zirconia, and palladium at concentrations of 45%, 3%, 49, 0.8%, and 1.6%, respectively, based on the calcined weight (79 g) of washcoat. The total loading of the layer was 1.32 g/in$^3$. The palladium (36 g/ft$^3$) in the form of palladium nitrate solutions were impregnated by planetary mixer (P-mixer) onto the stabilized alumina and onto the ceria zirconia composite, while each achieving incipient wetness. The aqueous slurry was then individually milled to 90% less than 10 microns. The other components such as promoters and binders were introduced as their soluble salts using water as the slurrying vehicle. They were all combined with all and homogenized for at least 15 minutes before being coated onto the inner layer. After coating, the carrier plus the inner and first middle layers were calcined at a temperature of 550° C. for at least 2 hours.

Second Middle Layer

After cooling, the second middle layer was coated onto the first middle layer. The components present in the second middle layer were high surface area lanthana-stabilized gamma alumina, lanthanum oxide, zirconium oxide, neodymium oxide, and palladium at concentrations of 80%, 8%, 2%, 8%, and 2%, respectively, based on the calcined weight (60 g) of the washcoat. The total loading of the second layer was 1.0 g/in$^3$. The palladium (36 g/ft$^3$) in the form of palladium nitrate solutions were impregnated by planetary mixer (P-mixer) onto the stabilized alumina to form a wet powder while achieving incipient wetness. The other components such as promoters and binders were introduced as their soluble salts using water as the slurrying vehicle. The aqueous slurry was formed by combining all above components and milled to a particle size of 90% less than 10 microns and coated onto the first layer. After coating, the carrier plus the inner, first middle, and second middle layers were calcined at a temperature of 550° C. for at least 2 hours.

Outer Layer

The components present in the outer layer were zirconia-stabilized gamma alumina, a composite of cerium and zirconia with ~36% ceria content, zirconium oxide and alumina oxide as binders, and rhodium at concentrations of 34%, 61%, 1.4%, 3.0%, and 0.47%, respectively, based on the calcined weight (90 g) of the washcoat. The total loading of the second layer was 1.47 g/in$^3$. The catalyst was prepared by impregnating rhodium nitrate by P-mixer onto stabilized gamma alumina and onto the composite cerium and zirconium. The rhodium-alumina and rhodium-ceria-zirconia powders were each added into a basic solution containing an organic amine and mixed for 10 minutes. Each slurry then was acidified by diluted nitric or tartaric acid to bring pH range to 4~5 for milling. The aqueous slurry was individually milled to a particle size of 90% less than 10 microns before they were combined. The combined resultant slurry having a solids content of about 28%, and was either milled briefly again or homogenized to ensure particle size to be 90% less than 10 microns. It was thereafter coated onto the second middle layer. The resultant carrier plus inner, first middle, second middle, and outer layers were calcined at 450° C. for no less than 2 hours.

Example 6

A composite having a catalytic material was prepared using four layers: an inner layer, a first middle layer, a second middle layer, and an outer layer. In this example, the composition is generally referred to as UC/Pd/Pd'/Rh. The layered catalyst composite contained palladium and rhodium with a total precious metal loading of 84 g/ft$^3$ and with a palladium to rhodium ratio of 6:1. The substrate was 1 liter volume, with a cell density of 400 cells per square inch and with wall thickness around 88 μm. The layers were prepared as follows:

Inner Layer

The inner layer was prepared as described for the inner layer of Example 5.

First Middle Layer

The first middle layer was prepared as described for the second middle layer of Example 5.

Second Middle Layer

The second middle layer was prepared as described for the first middle layer of Example 5.

Outer Layer

The components present in the outer layer were high surface area zirconia-stabilized gamma alumina, a composite of cerium and zirconium oxide with ~36% ceria content, zirconium oxide and alumina oxide as binders, and rhodium at concentrations of 71%, 24%, 1.6%, 3.0%, and 0.55%, respectively, based on the calcined weight (76 g) of the washcoat. The total loading of the layer was 1.27 g/in$^3$. The slurry was prepared and coated the same way as the outer layer of Example 5 except that the rhodium distribution onto stabilized gamma-alumina and composite ceria and zirconia was changed to a ratio of 90/10. It was thereafter coated onto the second middle layer. The resultant carrier plus inner, first middle, second middle, and outer layers were calcined at 450° C. for no less than 2 hours.

Example 7

A composite having a catalytic material was prepared using five layers: an inner layer, a first middle layer, a second middle layer, a third middle layer, and an outer layer. In this example, the composition is generally referred to as UC'/Pd'/Pd/Rh1/Rh2'. The layered catalyst composite contained the same precious metal loading of 84 g/ft$^3$ and 6:1 palladium and rhodium ratio and was coated on the same substrate indicated in Example 5. The first three layers, namely the inner layer, the first middle layer, and the second middle layer were prepared as the same way as Example 5, while the last Rh layer was split into two layers. The third middle layer was made with the same composition as the outer layer of Example 6, but coated with half of the quantity used in Example 6 (30 g). The outer layer was made with the same composition as Example 5 outer layer, but coated with half the quantity used in Example 5 (45 g). The "Rh1" designation of the third middle layer refers to a ceria loading of ~8.6%, which was a lower loading that that of the outer layer, designated "Rh2" which had a ceria loading ~22%.

Example 8

A composite having a catalytic material was prepared using five layers: an inner layer, a first middle layer, a second middle layer, a third middle layer, and an outer layer. In this example, the composition is generally referred to as UC'/Pd'/Pd/Rh2'/Rh1. The first three layers, namely the inner layer, the first middle layer, and the second middle layer were the same as Example 7. The last Rh layers were coated in reversed sequence as compared to Example 7. In this way, the third middle layer (Rh2') had a ceria loading of ~22%, while the outer layer (Rh1) had a ceria loading of ~8.6%.

Example 9

A composite having a catalytic material was prepared using four layers: an inner layer, a first middle layer, a second middle layer, and an outer layer. In this example, the composition is generally referred to as UC'/Pd/Rh'/Pd. The layered catalyst composite contained palladium and rhodium with a total precious metal loading of 84 g/ft$^3$ and with a palladium to rhodium ratio of 6:1. The substrate was 1 liter volume, with a cell density of 400 cells per square inch and with wall thickness around 88 μm. The layers were prepared as follows:

Inner Layer

The inner layer was prepared as described for the inner layer of Example 5.

First Middle Layer

The first middle layer was prepared as described for the first middle layer of Example 6.

Second Middle Layer

The second middle layer was prepared as described for the outer layer of Example 5.

Outer Layer

The components present in the outer le layer were high surface area barium oxide-lanthana-stabilized gamma alumina, a composite of cerium and zirconium oxide with ~36% ceria content, zirconium oxide, and palladium at concentrations of 67%, 29%, 2%, and 2%, respectively, based on the calcined weight (60 g) of the washcoat. The total loading of the layer was 1.0 g/in$^3$. The palladium (36 g/ft$^3$) in the form of palladium nitrate solutions were impregnated by planetary mixer (P-mixer) onto the stabilized alumina to form a wet powder while achieving incipient wetness. The other components such as promoters and binders were introduced as their soluble salts using water as the slurrying vehicle. The aqueous slurry was then formed by combining all above components and milled to a particle size of 90% less than 10 microns and coated onto the first layer. After coating, the carrier plus the inner layer and first middle layer were calcined at a temperature of 550° C. for at least 2 hours.

Example 10

Prior to evaluation, the layered catalyst composites of Examples 5, 6, 7, 8, and 9 were aged on a gasoline engine at 900° C. for 50 hours. The evaluations were performed on a 2.3 L engine using the US FTP-75 testing procedure. The total amount of hydrocarbons, carbon monoxide, and nitrogen oxides was measured by collecting three bags and the weighed average was calculated. The results of the evaluations are set forth in Table I below with all the emissions in mg/mile units, and for 3 bags total.

TABLE 1

| Example | HC Emission (mg/mile) | CO Emission (mg/mile) | NO$_x$ Emission (mg/mile) |
|---|---|---|---|
| 5 | 138 | 945 | 127 |
| 7 | 131 | 907 | 145 |
| 8 | 119 | 896 | 150 |
| 6 | 113 | 654 | 89 |
| 9 | 91 | 1106 | 238 |

The results of the evaluation, as displayed in Table 1, show that the HC emissions can be improved by changing the four-layered catalyst of Example 5 to the five-layered catalyst of Example 8. The fifth layer with rhodium on alumina assisted HC conversion, at expense of some NO$_x$ conversion. This suggests that precious metal on alumina can enhance HC activity, while precious metal with OSS is more beneficial for NOx conversion.

With regard to the four layered catalysts of Examples 5 and 6, HC and NOx were both improved with the catalyst of Example 6, having 3 layers (1$^{st}$, 2$^{nd}$, and 4$^{th}$) with low or no OSC, as compared to Example 5, having only 1 layer with no OSC (3$^{rd}$).

Further, with regard to the four-layered catalysts of Examples 5 and 9, HC performance improved with the catalyst of Example 9, where the first middle layer of Example 5 was removed and a low OSC palladium layer was added to the top. This indicates that high palladium concentration near a gas-solid interface can be beneficial to HC conversion. All the examples indicated that several layers with different combination of precious metals and OSC can be combined in different sequences to achieve engine-specific after-treatment requirements. Moreover, by changing coating sequences, different performances can be achieved.

Example 11

Comparative Example

A layered catalyst composite was prepared using three layers: an inner layer, a middle layer, and an outer layer. In this example, the composition contained platinum, palladium, and rhodium with a total precious metal loading of 50.9 g/ft$^3$ and with platinum:palladium:rhodium ratio of 5:5:2, respectively. The substrates used were 1.0 liter volume, with cell density of 600 cells per square inch and with wall thickness around 3.5 mils or 88 μm.

Inner Layer

The components present in the inner layer were high surface area lanthana-stabilized γ-alumina, zirconium oxide, a first composite of ceria and zirconium oxide with ~45% ceria content, a second composite of ceria and zirconium oxide with ~57% ceria content, and platinum at the concentrations of 15.2%, 45.6% 30.5%, 7.6%, and 1.1%, respectively, based on the calcined weight of the washcoat. The total loading of the layer was 1.1 g/in$^3$. The platinum (21.2 g/ft$^3$) in the form of soluble platinum amine solutions were impregnated by planetary mixer onto the stabilized alumina and the first ceria zirconia composite mix together to form a wet powder while achieving incipient wetness. The other components such as zirconia binder was introduced as its soluble salt using water as the slurrying vehicle. The aqueous slurry was milled to 90% less than 10 microns and was combined with the second ceria zirconia composite, and homogenized again before been coated onto the substrate. After coating, the carrier plus the inner layer were calcined at a temperature of 550° C. for at least 2 hours.

Middle Layer

The components present in the middle layer were high surface area lanthania stabilized γ-alumina, a composite of ceria and zirconium oxide with ~45% ceria content, barium oxide, zirconium oxide, and palladium at the concentrations of 27.6%, 64.4%, 2.8%, 4.6%, and 0.7%, respectively, based on the calcined weight of the washcoat. The total loading of the layer was 1.81 g/in$^3$. The aqueous slurry containing palladium (21.2 g/ft$^3$) from its nitrate solution were impregnated by planetary mixer (P-mixer) onto the stabilized alumina and ceria zirconia composite mixed together to form wet powder while achieving incipient wetness. The other components such as promoters and binders were introduced as their soluble salts using water as the slurrying vehicle. The aqueous slurry was individually milled to 90% less than 10 microns and was combined with all of the above components and homogenized again before being coated onto the inner layer. After coating, the carrier plus the inner and middle layers were calcined at a temperature of 550° C. for at least 2 hours.

Outer Layer

The components present in the outer layer were high surface area lanthana stabilized γ-alumina, a first composite of cerium and zirconia with ~30% ceria content, a second composite of ceria and zirconium oxide with ~45% ceria content, zirconium oxide, and rhodium at the concentrations of 24.3%, 48.7%, 24.3%, 2.4%, and 0.2%, respectively, based on the calcined weight of the washcoat. The total loading of the layer was 2.05 g/in$^3$. The catalyst was prepared by impregnating rhodium nitrate by P-mixer onto stabilized γ-alumina and the first composite cerium and zirconium mixed together to near the incipient wetness. The rhodium-containing powders were added into zirconium hydroxide suspension and mixed for 10 minutes. The slurry then was acidified with nitric acid to bring pH range to 4~5 for milling. The aqueous slurry was combined with the first ceria zirconia composite and milled to a particle size of 90% less than 10 microns. The combined resultant slurry having a solids content of about 28%, coated onto the second layer. The resultant carrier plus inner, middle, and outer layers were calcined at 450° C. for no less than 2 hours.

Example 12

A layered catalyst composite was prepared using four layers: an inner layer, a first middle layer, a second middle layer, and an outer layer. In this example, the composition contained platinum, palladium, and rhodium with a total precious metal loading of 50.9 g/ft$^3$ and with platinum:palladium:rhodium ratio of 5:5:2, respectively. The substrates used were 1.0 liter volume, with cell density of 600 cells per square inch and with wall thickness around 3.5 mils or 88 μm.

Inner Layer

The components present in the inner layer were high surface area gamma alumina, a composite of ceria and zirconium oxide with ~36% ceria content, zirconium oxide, and alumina oxide at the concentrations of 33%, 58%, 5%, and 4%, respectively, based on the calcined weight of washcoat. The total loading of the layer was 1.13 g/in$^3$. The zirconium oxide and alumina oxide were introduced as colloidal solutions. The aqueous slurry around 44% solids content and pH around 4.5 was formed by combining all above components and milled to a particle size of 90% less than 10 microns and coated onto the cordierite carrier. After coating, the carrier plus the inner layer were calcined at a temperature of 430° C. for at least 2 hour.

First Middle Layer

The components present in the first middle layer were high surface area lanthana-stabilized γ-alumina, barium oxide, zirconium oxide, a composite of ceria and zirconium oxide with ~36% ceria content, and platinum at the concentrations of 45.7%, 3%, 0.8%, 49.5% and 0.94%, respectively, based on the calcined weight of the washcoat. The total loading of the layer was 1.31 g/in$^3$. The platinum (21.2 g/ft$^3$) in the form of platinum amine solutions were impregnated by planetary mixer (P-mixer) onto the stabilized alumina and onto the ceria zirconia composite, while achieving incipient wetness. The other components such as promoters and binders were introduced as their soluble salts using water as the slurrying vehicle. The aqueous slurry was individually milled to 90% less than 10 microns and was combined with all above components and homogenized again before being coated onto the inner layer. After coating, the carrier plus the inner and first middle layers were calcined at a temperature of 550° C. for at least 2 hours.

Second Middle Layer

After cooling, the second middle layer was coated onto the first middle layer. The components present in the second middle layer were high surface area lanthana- and barium oxide-stabilized γ-alumina, mixed oxide of cerium and zirconium with ~36% ceria, zirconia, and palladium at the concentrations of 67.8%, 29.1%, 1.9%, and 1.2%, based on the calcined weight of the washcoat. The total loading of the layer was 1.03 g/in$^3$. An aqueous slurry containing palladium (21.2 g/ft$^3$) from its nitrate solution was prepared. The aqueous slurry was milled to a particle size of less than 10 microns and coated onto the second layer. After coating, the carrier plus the inner, first middle, and second middle layers were calcined at a temperature of 550° C. for at least 2 hours.

Outer Layer

The components present in the outer layer were high surface area zirconia-stabilized γ-alumina, a composite of cerium and zirconium oxide with ~36% ceria content, zirconium oxide and alumina oxide as binders, and rhodium at the concentrations of 34%, 61%, 1.4%, 3.0%, and 0.34%, respectively, based on the calcined weight of the washcoat. The total loading of the layer was 1.47 g/in$^3$. The catalyst was prepared by impregnating rhodium nitrate by P-mixer onto stabilized γ-alumina and composite cerium and zirconium separately with a distribution of 90/10 ratio. The rhodium-alumina and rhodium-ceria-zirconia powders were each added into a basic solution containing an organic amine and mixed for 10 minutes. Each slurry then was acidified to bring pH range to 4~5 for milling. The aqueous slurry was individually milled to a particle size of 90% less than 10 microns before they were combined. The combined resultant slurry having a solids content of about 28%, and can be either milled briefly again or homogenized to ensure particle size to be 90% less than 10 microns. It was thereafter coated onto the second middle layer. The carrier plus inner, first middle, second middle, and outer layers were calcined at 450° C. for no less than 2 hours.

Example 13

Testing

The catalyst of Examples 11 and 12 were engine aged for 100 hours with maximum catalyst bed temperature ~1050° C.

The aged samples were evaluated by a 4.6 L, V8 engine for performance. Sweep test, which involves shifting air to fuel ratio from lean to rich with perturbation, was employed to test the performance of the catalyst when it was already hot enough for efficient conversion. The results of the sweep test are shown in Table 2. Samples in this example were tested under 400° C. bed temperature, with air to fuel ratio oscillation of ±0.5 from the stoichiometry at 1 Hz. The space velocity was 100,000 hr$^{-1}$.

TABLE 2

| Crossover Conversion: | CO/NO$_x$ | HC/NO$_x$ |
|---|---|---|
| Example 11 | 46% | 48% |
| Example 12 | 61% | 69% |

A light-off evaluation was also performed to research the low-temperature activity and the results are shown in Table 3. The same engine setup was employed and the bed temperature was gradually raised to approximately 250° C. The temperature at which 50% conversion of each gas species occur is reported.

TABLE 3

|  | HC, ° C. | CO, ° C. | NO$_x$, ° C. |
|---|---|---|---|
| Example 11 | 435 | 437 | 435 |
| Example 12 | 411 | 412 | 404 |

Both light-off and sweep test results indicated the benefits of using four-layers-catalyst Example 12 over three-layer-catalyst Example 11.

By separating and/or combining precious metals with OSC in several layers in different way, a catalyst composite can achieve the goals of improving all HC/CO/NOx activity without sacrificing one another.

Example 14

A layered catalyst composite was prepared using four layers: an inner layer, a first middle layer, a second middle layer, and an outer layer. In this example, the composition is generally referred to as HCT/Pd/Rh/Pd, where HCT refers to hydrocarbon trap. The composition contained palladium, and rhodium with a total precious metal loading of 143 g/ft$^3$ and with platinum:palladium:rhodium ratio of 0:140:3, respectively. The composite was effective for hydrocarbon reduction and was made in accordance with the preparation of the layered catalyst composite methods described above.

Inner Layer

The components present in the inner layer, which was formed by two coats of the same washcoat, were a zeolite, zirconium oxide, and strontium oxide at the concentrations of 89%, 8%, and 3%, respectively, based on the calcined weight of washcoats. The total loading of the layer was 2.25 g/in$^3$.

First Middle Layer

The components present in the first middle layer were high surface area Ba—La—Nd-stabilized γ-alumina, strontium oxide, zirconium oxide, a composite of ceria and zirconium oxide with ~30% ceria content, an alumina binder, and palladium at the concentrations of 46.1%, 3.3%, 3.3%, 44.1%, 2.6 and 0.6%, respectively, based on the calcined weight of the washcoat. The total loading of the layer was 0.74 g/in$^3$.

Second Middle Layer

The second middle layer was coated onto the first middle layer. The components present in the second middle layer were high surface area lanthana- and zirconium oxide-stabilized γ-alumina, mixed oxide of cerium and zirconium with ~30% ceria, zirconium oxide, an aluminum binder, and rhodium at the concentrations of 63.0%, 31.5%, 1.1%, 4.2%, and 0.2%, based on the calcined weight of the washcoat. The total loading of the layer was 0.71 g/in$^3$.

Outer Layer

The components present in the outer layer were high surface area Ba—La—Nd-stabilized γ-alumina, zirconium oxide, a composite of ceria and zirconium oxide with ~36% ceria content, an alumina binder, and palladium at the concentrations of 80.6%, 1.2%, 11.5%, 2.3%, and 4.4%, respectively, based on the calcined weight of the washcoat. The total loading of the layer was 1.74 g/in$^3$.

Example 15

A layered catalyst composite is prepared using five layers: an inner layer, a first middle layer, a second middle layer, a third middle layer, and an outer layer. In this example, the composition is generally referred to as UC/Pd/Rh/Pd'/Rh', where UC refers to an undercoat. The UC is coated with an alumina, such as a stabilized alumina and is substantially free of precious metals. The first middle layer contains Pd and high OSC. The second middle layer contains Rh and high OSC. The third middle layer contains Pd and low OSC. The outer layer contains Rh and low OSC.

Example 16

A layered catalyst composite is prepared using five layers: an inner layer, a first middle layer, a second middle layer, a third middle layer, and an outer layer. In this example, the composition is generally referred to as UC/Pd/Rh/Rh'/Pd', where UC refers to an undercoat. The UC is coated with an alumina, such as a stabilized alumina and is substantially free of precious metals. The first middle layer contains Pd and high OSC. The second middle layer contains Rh and high OSC. The third middle layer contains Rh and low OSC. The outer layer contains Pd and low OSC.

It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A layered catalyst composite comprising a catalytic material on a carrier, the catalytic material comprising at least five layers, each of the layers including a support, wherein at least four layers comprise a precious metal component on the supports of each of the at least four layers, at least one layer comprises an oxygen storage component, at least one layer is substantially free of an oxygen storage component, and wherein the catalytic material is effective to substantially simultaneously oxidize the carbon monoxide and the hydrocarbons and reduce the nitrogen oxides.

2. The composite of claim 1, wherein one of the at least four layers comprising the precious metal component comprises the oxygen storage component.

3. The composite of claim 2, wherein one layer is deposited on the carrier to form an undercoat layer, and the undercoat layer is substantially free of an oxygen storage component.

4. The composite of claim 3, wherein at least two layers in addition to the undercoat layer are substantially free of an oxygen storage component; wherein a first middle layer is deposited on the carrier, a second middle layer is deposited on the first middle layer, a third middle layer is deposited on the second middle layer, and an outer layer is deposited on the third middle layer; wherein a first precious metal component of the first middle layer comprises a palladium component, a second precious metal component of the second middle layer comprises a palladium component, a third precious metal component of the third middle layer comprises a rhodium component, and a fourth precious metal component of the outer layer comprises a rhodium component.

5. The composite of claim 4, wherein the third middle layer further comprises from approximately 15% to approximately 20% of an oxygen storage component by weight of the layer.

6. The composite of claim 2, wherein one layer is deposited on the carrier to form an undercoat layer, and the undercoat layer comprises an oxygen storage component.

7. The composite of claim 6, wherein a first middle layer is deposited on the undercoat layer, a second middle layer is deposited on the first middle layer, a third middle layer is deposited on the second middle layer, and an outer layer is deposited on the third middle layer; wherein a first precious metal component of the first middle layer comprises a palladium component, a second precious metal component of the second middle layer comprises a palladium component, a third precious metal component of the third middle layer comprises a rhodium component, and a fourth precious metal component of the outer layer comprises a rhodium component.

8. The composite of claim 7, wherein the outer layer further comprises a platinum component.

9. The composite of claim 7, wherein the undercoat layer comprises from approximately 30% to approximately 35% of a first oxygen storage component by weight of the layer, the first middle layer further comprises from approximately 20% to approximately 25% of a second oxygen component by weight of the layer, the third middle layer further comprises from approximately 3.5% to approximately 6.5% of a third oxygen storage component by weight of the layer, and the outer layer further comprises from approximately 15% to approximately 20% by weight of the layer of a fourth oxygen storage component.

10. The composite of claim 7, wherein the undercoat layer comprises from approximately 18% to approximately 23% of an oxygen storage component by weight of the layer, the third middle layer further comprises from approximately 15% to approximately 20% of an oxygen storage component by weight of the layer, and the outer layer further comprises from approximately 19% to approximately 24% of an oxygen storage component by weight of the layer.

11. The composite of claim 1, wherein the precious metal component of the at least four layers independently comprises platinum, palladium, rhodium, or combinations thereof.

12. The composite of claim 1, wherein the support of each layer independently comprises a compound that is activated, stabilized, or both selected from the group consisting of alumina, silica, silica-alumina, alumino-silicates, alumina-zirconia, lanthana-alumina, lanthana-zirconia-alumina, baria-alumina, baria lanthana-alumina, alumina-chromia, and alumina-ceria.

13. The composite of claim 1, wherein the oxygen storage component independently comprises ceria, praseodymia, or combinations thereof.

14. A layered catalyst composite comprising a catalytic material on a carrier, the catalytic material comprising at least four layers, each of the layers including a support, wherein at least three layers comprise a precious metal component on the supports of each of the at least three layers, at least one layer comprises an oxygen storage component, and wherein the catalytic material is effective to substantially simultaneously oxidize the carbon monoxide and the hydrocarbons and reduce the nitrogen oxides, wherein one of the at least three layers comprising the precious metal component comprises the oxygen storage component;

wherein one layer is deposited on the carrier to form an undercoat layer, and the undercoat layer comprises an oxygen storage component;

wherein a first middle layer is deposited on the undercoat layer, a second middle layer is deposited on the first middle layer, and an outer layer is deposited on the second middle layer; wherein a first precious metal component of the first middle layer comprises a palladium component, a second precious metal component of the second middle layer comprises a rhodium component, and a third precious metal component of the outer layer comprises a palladium component.

15. The composite of claim 14, wherein the second middle layer further comprises a platinum component.

16. The composite of claim 14, wherein the undercoat layer comprises from approximately 30% to approximately 35% of a first oxygen storage component by weight of the layer, the first middle layer further comprises from approximately 20% to approximately 25% of a second oxygen component by weight of the layer, the second middle layer further comprises from approximately 15% to approximately 20% of a third oxygen storage component by weight of the layer, and the outer layer further comprises from approximately 3.5% to approximately 6.5% of a fourth oxygen storage component by weight of the layer.

17. A method for treating an exhaust gas of a mobile source comprising: contacting a gaseous stream comprising hydrocarbons, carbon monoxide, and nitrogen oxides with the layered catalyst composite of claim 14.

18. A method for treating an exhaust gas of a mobile source comprising: contacting a gaseous stream comprising hydrocarbons, carbon monoxide, and nitrogen oxides with the layered catalyst composite of claim 1.

19. A method comprising locating in an exhaust system the multi-layered catalyst composite of claim 14.

20. The method of claim 19, wherein the outer layer comprises rhodium or palladium, and the other of the second middle layer or the outer layer comprises palladium or rhodium, and wherein one of the outer layer or the second middle layer is substantially free of an oxygen storage component while the other of the second middle layer or the outer layer contains an oxygen storage component.

21. The method of claim 19, wherein an outer layer and a second middle layer each comprises palladium, wherein one of the outer layer or the second middle layer is substantially free of an oxygen storage component while the other of the second middle layer or the outer layer contains an oxygen storage component.

22. A method comprising locating in an exhaust system the multi-layered catalyst composite of claim 1.

23. A layered catalyst composite comprising a catalytic material on a carrier, the catalytic material comprising at least four layers and being effective to substantially simultaneously oxidize carbon monoxide and hydrocarbons and reduce nitrogen oxides, wherein:

an undercoat layer on the carrier comprises an alumina support and an oxygen storage component;

a first middle layer on the undercoat layer comprises a lanthana-alumina support, an oxygen storage component, and a palladium component;

a second middle layer on the first middle layer comprises an alumina-zirconia support, an oxygen storage component, a rhodium component, and an outer layer on the second middle layer comprises an alumina-zirconia support, an oxygen storage component, and a palladium component.

24. The composite of claim 23, wherein the oxygen storage component of each layer independently comprises a ceria-zirconia composite.

25. The composite of claim 23, wherein the second middle layer further comprises a platinum component.

* * * * *